(12) United States Patent
Dietrich

(10) Patent No.: US 9,240,992 B2
(45) Date of Patent: *Jan. 19, 2016

(54) METHOD FOR PRODUCING A SOFT TOKEN

(75) Inventor: Frank Dietrich, Berlin (DE)

(73) Assignee: BUNDESDRUCKEREI GMBH, Berlin (DE)

( * ) Notice: Subject to any disclaimer, the term of this patent is extended or adjusted under 35 U.S.C. 154(b) by 874 days.

This patent is subject to a terminal disclaimer.

(21) Appl. No.: 13/380,223

(22) PCT Filed: Jul. 5, 2010

(86) PCT No.: PCT/EP2010/059577
§ 371 (c)(1),
(2), (4) Date: Mar. 12, 2012

(87) PCT Pub. No.: WO2011/006790
PCT Pub. Date: Jan. 20, 2011

(65) Prior Publication Data
US 2012/0167186 A1    Jun. 28, 2012

(30) Foreign Application Priority Data

Jul. 14, 2009    (DE) .......................... 10 2009 027 682

(51) Int. Cl.
*G06F 7/04*    (2006.01)
*H04L 29/06*    (2006.01)
(Continued)

(52) U.S. Cl.
CPC ............ *H04L 63/0823* (2013.01); *G06F 21/34* (2013.01); *G06F 21/41* (2013.01); *H04L 63/0853* (2013.01)

(58) Field of Classification Search
CPC ................................................ H04L 63/0823

USPC .............................................................. 726/6
See application file for complete search history.

(56) References Cited

U.S. PATENT DOCUMENTS 5,825,875 A * 10/1998 Ugon .............................. 705/65
6,038,551 A *  3/2000 Barlow et al. ................... 705/41
(Continued)

FOREIGN PATENT DOCUMENTS

CN          101005513           7/2007
CN          101048790          10/2007
(Continued)

OTHER PUBLICATIONS

Duncan de Borde, "Selecting a two-factor authentication system," Network Security, Jul. 2007, pp. 17-20.*
(Continued)

*Primary Examiner* — Luu Pham
*Assistant Examiner* — Canh Le
(74) *Attorney, Agent, or Firm* — Leveque Intellectual Property Law, P.C.

(57) ABSTRACT

The invention relates to a method for reading the at least one attribute stored in an ID token (106, 106'), wherein the ID token is assigned to a user (102), having the following steps:
  Authentication of the user with respect to the ID token,
  Authentication of a first computer system (136) with respect to the ID token,
after successful authentication of the user and the first computer system with respect to the ID token, read access of the first computer system to the at least one attribute stored in the ID token, generation of a first soft token through providing a signature to the at least one attribute read from the ID token via the first computer system, sending the first soft token to a device.

16 Claims, 4 Drawing Sheets

(51) Int. Cl.
*G06F 21/34* (2013.01)
*G06F 21/41* (2013.01)

(56) References Cited

U.S. PATENT DOCUMENTS

| | | | | |
|---|---|---|---|---|
| 6,360,254 | B1* | 3/2002 | Linden et al. | 709/219 |
| 7,536,722 | B1* | 5/2009 | Saltz | G06F 21/33 726/20 |
| 8,171,531 | B2* | 5/2012 | Buer | 726/6 |
| 8,621,561 | B2* | 12/2013 | Cross | H04L 9/3213 705/65 |
| 8,799,639 | B2* | 8/2014 | Balazs et al. | 713/152 |
| 8,813,243 | B2* | 8/2014 | Parkinson | G06F 21/33 380/1 |
| 8,832,453 | B2* | 9/2014 | Lord | H04L 63/083 713/185 |
| 2001/0027527 | A1* | 10/2001 | Khidekel et al. | 713/201 |
| 2001/0045451 | A1* | 11/2001 | Tan et al. | 235/375 |
| 2004/0034774 | A1* | 2/2004 | Le Saint | 713/169 |
| 2004/0128247 | A1* | 7/2004 | Sato et al. | 705/41 |
| 2004/0139028 | A1* | 7/2004 | Fishman et al. | 705/67 |
| 2004/0210757 | A1* | 10/2004 | Kogan et al. | 713/182 |
| 2005/0138421 | A1* | 6/2005 | Fedronic et al. | 713/201 |
| 2007/0124812 | A1* | 5/2007 | Weeks et al. | 726/10 |
| 2007/0204325 | A1* | 8/2007 | Cameron et al. | 726/1 |
| 2007/0283424 | A1* | 12/2007 | Kinser et al. | 726/5 |
| 2008/0010220 | A1* | 1/2008 | Hobson et al. | 705/76 |
| 2009/0198618 | A1* | 8/2009 | Chan | G06F 21/33 705/66 |
| 2010/0172503 | A1* | 7/2010 | Neumann | H04L 9/0866 380/282 |

FOREIGN PATENT DOCUMENTS

| | | |
|---|---|---|
| DE | 102008000067 | 7/2009 |
| EP | 1 117 204 A2 | 7/2001 |
| FR | EP 1 802 155 A1 * | 6/2007 |
| WO | WO2006022513 | 3/2006 |

OTHER PUBLICATIONS

Jae-Jung Kim and Seng-Phil Hong, "A Method Assessment for Multi-Factor Authentication," Journal of INformation Processing Systems, vol. 7, No. 1, Mar. 2011, pp. 187-198.*

Federal Office for Information Security, Technical Guideline eID-Server, Part 2 Security Framework, BSI TR-03130-2, Version 2.0.1, Jan. 15, 2014 (English version of May 19, 2009 version originally cited in IDS submitted on Dec. 29, 2011).

Kain, M., Keller, G., What I am, SAML 2.0, a Tutorial, Part 1: Theory, vol. May 31, 2007 (English google translation of document originally cited in IDS submitted on Dec. 29, 2011).

Bundesamt Fur Sicherheit in Der Informationstechnik, BSI: Technische Richtlinie eID-Server, May 19, 2009, Bonn, XP002598177, pp. 1-49, Section 2.1, Section 2.2.1 and Section 2.2.2, Section 2.6, Section 4.3.3, Section 4.6 and 4.6.2, Appendix A.

M. Kain, G. Keller: SAML 2.0, ein Tutorium—Teil 1: Theorie, vol. 5/2007, May 31, 2007, pp. 55-59, XP002598178, the whole document.

Bundesamt Fur Sicherheit in Der Informationstechnik, Advanced Security Mechanisms for Machine Readable Travel Documents—Extended Access Control (EAC), Technical Guideline TR-03110, Version 1.11, Feb. 21, 2008, pp. 1-59, XP002565917, Section 4 and 4.2.

International Telecommunication Union, Information Technology—Open Systems Interconnection—The Directory: Public-key and Attribute Certificate Frameworks, X.509 (Aug. 2005), ITU-T Telecommunication Standardization Sector of ITU, Aug. 29, 2005, XP017405086, the whole document.

* cited by examiner

METHOD FOR PRODUCING A SOFT TOKEN

The invention relates to a process for the generation of a soft token, a computer program product, an ID token, and a computer system.

Various processes for the administration of the so-called digital identity of a user are known from the state of the art:

Microsoft Windows CardSpace is a client-based digital identity system that is intended to enable Internet users to communicate their digital identity to online services. One disadvantageous aspect in this regard is, among other things, the fact that the user is able to manipulate his digital identity.

OPENID, on the other hand, is a server-based system. A so-called identity server stores a database with digital identities of the registered users. One disadvantageous aspect in this regard is, among other things, the lack of data protection, since the digital identities of the users are centrally stored, and user behavior can be recorded.

An additional process for the administration of digital identities is known from U.S. 2007/0294431 A1, which likewise requires user registration.

Token-based authentication processes are disclosed in patent applications DE 10 2008 000 067.1-31, DE 10 2008 040 416.0-31, DE 10 2008 042 262.2-31 and DE 10 2009 026 953.3 by the same patent applicant, which were unpublished at the time of the application.

The invention, in contrast, is based on the problem of creating an improved process for the generation of a soft token, as well as a corresponding computer program product, and ID token, and a computer system.

The problems on which the invention is based are in each instance solved by the attributes of the independent patent claims. Embodiments of the invention are stated in the dependent claims.

According to embodiments of the invention, a process is created for a reading of the at least one attribute stored in an ID token; in this regard, the ID token is assigned to a user. The process includes the following steps: authentication of the user in relation to the ID token; authentication of a first computer system in relation to the ID token; following successful authentication of the user and the first computer system in relation to the ID token, transfer of the at least one attribute stored in the ID, generation of a first soft token by means of the first computer system's signing of the at least one attribute read from the ID token, sending the first soft token to a device. A "trust anchor" can be created thereby.

Embodiments of the invention enable the first computer system to read one or more of the attributes stored in an ID token; in this regard, the connection between the ID token in the first computer system can be established via a network, in particular, the Internet. The at least one attribute can be an item of information with respect to the identity of the user assigned to the ID token, particularly with respect to his so-called digital identity. For example, the first computer system reads the first name, last name, and address attributes, in order to generate the first soft token thereof.

But it is also possible, for example, to read only a single attribute that does not serve the purpose of ascertaining the identity of the user, but instead, for example, checking the user's authorization to utilize a specific online service, such as, for example, the user's age, if the user wishes to utilize an online service that is reserved for a specific age group, or a different attribute that documents the user's affiliation with a specific group that is entitled to use the online service.

The ID token can be a portable electronic device, such as a so-called USB stick, or a document, particularly a value document or security document.

According to the invention, a "document" is understood to mean paper-based and/or plastic-based documents, such as identification documents, particularly passports, personal identification cards, visas, as well as driver's licenses, vehicle registration certificates, certificates of vehicle titles, company identification cards, insurance cards, or other ID documents, as well as chip cards, payment methods, particularly banknotes, bank cards, and credit cards, bills of lading, or other proof of authorization, into which memory data is integrated for the purpose of storing the at least one attribute.

A "soft token" is understood herein to be, in particular, a data record that is signed by a trustworthy authority and contains one or more attributes. Prior authentication in relation to the soft token can be a prerequisite for the reading an attribute from the soft token. For this purpose, the soft token can be designed in such a manner that a code, such as a password, PIN, or TAN, must first be entered before reading access to the soft token can take place. Such a soft token is also referred to as a soft token.

A "device" refers herein to electronic devices, particularly stationary or mobile computers, particularly mobile end devices, particularly devices with a communications interface for the purpose of receiving the first soft token and/or for the purpose of communication with a service computer system. In particular, the device can have an Internet browser, through which a user is able to direct a service request to the service computer system. For example, a device can be a mobile device with a mobile radio interface, such as, for example, a mobile telephone, a portable computer, a smart phone, or a personal digital assistant (PDA).

Embodiments of the invention are thus particularly advantageous, since the at least one attribute is read from a particularly trustworthy document, such as an official document. The fact that central storage of the attributes is not necessary is also particularly advantageous. Embodiments of the invention thus enable a particularly high degree of trustworthiness with respect to the communication of the attributes belonging to a digital identity, coupled with optimal data protection with very convenient handling.

According to one embodiment of the invention, the first computer system has at least one certificate that is used to authenticate the first computer system in relation to the ID token. The certificate contains an indication of the attributes for which the first computer system possesses read authorization. With the help of said certificate, the ID token checks to determine whether the first computer system has the necessary read authorization for read access to the attribute before the first computer system is able to carry out such read access.

A "certificate" is understood herein to mean a digital certificate, which is also referred to as a public key certificate. The certificate involves structured data that are used to assign a public key of an asymmetric cryptosystem to an identity, such as, for example, a person or apparatus. For example, the certificate can conform to the X.509 standard or a different standard.

According to one embodiment of the invention, the first computer system sends the first soft token directly to the device. From the first soft token, the device can generate a second soft token that contains a subset of the attributes of the first soft token. The device can send the second soft token or a copy of the first soft token to a second computer system. The second computer system can, for example, be a server for the rendering of an online service or another service, such as, for example, a banking service, or for the ordering of a product. For example, the user can open an account online, for which purpose attributes that include the user's identity are transmitted to the second computer system of a bank.

According to one embodiment of the invention, the transfer of the first soft token from the first computer system is first carried out via a third computer system of the user to the ID token via a connection with end-to-end encryption. Alternatively, the user can download the first soft token from the first computer system directly to the third computer system with the help of a typical Internet browser.

According to one embodiment of the invention, the second computer system can, pursuant to a service request from the device, specify the attributes—of the user or his ID token, for example—that are needed in order to render the service or accept the purchase order. The appropriate attribute specification, which includes the specification of such attributes, is then sent by the second computer system to the device.

According to one embodiment of the invention, the first soft token is transferred by the first computer system to the third computer system. The user of the third computer system can read the attributes contained in first soft token, but is not, however, able to change them. Only upon approval by the user does the third computer system forward the soft token to the device.

According to one embodiment of the invention, the user can supplement the attributes of the first soft token with additional data before they are forwarded.

According to one embodiment of the invention, the first computer system has multiple certificates with different read rights. On the basis of receipt of a signal with an attribute specification, the first computer system selects one or more of such certificates in order to read the appropriate attributes from the ID token or multiple different ID tokens.

According to one embodiment of the invention, the first computer system receives a signal from the third computer system of the user. The signal signals to the first computer system that a first soft token is supposed to be generated for the user's ID token. The signal can include a first attribute specification, in which the attributes of the ID token, for which the first soft token is supposed to be generated, are specified. In addition, the signal can also indicate the address of the device to which the first soft token is supposed to be transferred. That address can, for example, be a telephone number of the device or an e-mail address.

On the basis of receipt of such signal, the attributes are transferred by the ID token to the first computer system after the user has authenticated himself in relation to the ID token and after a mutual authentication of the ID token and the first computer system has taken place. The transfer of attributes from the ID token to the first computer system preferably takes place via a connection with end-to-end encryption.

For example, the mutual authentication of the ID token and the first computer system is carried out according to a challenge-response process. From a challenge that is used for the execution of such a challenge-response process, a symmetrical key is derived that is used for the end-to-end encryption of the connection, in order to transfer the attributes via such connection.

According to one embodiment of the invention, the first computer system provides a time stamp to the attributes received from the ID token. This time stamp can indicate the time of receipt or a time of transmission of the attributes. Preferably, the time stamp states a maximum period of validity.

Preferably, each of the individual attributes is provided with a time stamp. The linking of an individual attribute to its time stamp is separately signed in each instance. The signed time-stamped attributes are then consolidated into the first soft token. The first computer system can, for example, generate a TAN list for the first soft token. The TAN list is mailed to the user, for example, in the form of a printout or transmitted electronically, such as via SMS or e-mail, or the user can download the TAN list from a website of the first computer system.

According to one embodiment of the invention, the first soft token is sent by the first computer system directly to the device. In the device, the first soft token is stored. Alternatively, the first soft token is initially transmitted by the first computer system to the third computer system. From the third computer system, the first soft token can be transmitted to the device, wherein the user has the prior capability to approve the transmission and/or add additional information to the first soft token. It is a particular advantage here that the device is not required to have any interface for the ID token, and only has to have a communications interface with which the device can receive the first soft token.

According to one embodiment of the invention, the user can utilize a service offered by the second computer system, i.e., the service computer system, with the help of his device, via the Internet for example. To do so, the user launches an Internet browser of his device and enters the URL of a website of the second computer system. On this website, the user selects a desired service and actuates on his device an enter key, so that a corresponding service request is transmitted from the device to the second computer system. The second computer system replies to this service request with an attribute specification, in which those attributes are indicated that the second computer system requires to provide the requested service.

The device then accesses the first soft token and reads those signed and time-stamped attributes from the first soft token, which are provided by the attribute specification of the second computer system. All attributes of the first soft token or a partial quantity of this attributes may be involved here. These signed and time-stamped attributes are introduced in a second soft token that is transmitted from the device to the second computer system. A prerequisite for sending the second soft token may be that the user must first authenticate himself relative to the first token via the device, for example, by the user entering an identifier, in particular, one of the TANs from his TAN list, into the device.

According to one embodiment of the invention, the second computer system, after receiving the second soft token, verifies the validity of the signatures of the attributes. In addition, the second computer system verifies whether the second soft token is still within its validity period, which is indicated by the time stamps of the attributes. If the signatures are valid and the validity period is not exceeded, then the second computer system provides the requested service to the extent that the attributes meet the criteria required to do so.

Embodiments of the invention are especially advantageous, since the first computer system cannot generate a profile in regard to usage of the first soft token, given that the usage of the soft token is not required to be signaled to the first computer system. In fact, the use of the first soft token takes place between the device and the second computer system.

In an additional aspect, the invention relates to a computer program product, in particular a digital storage medium with executable program instructions to execute a process according to the invention.

In an additional aspect, the invention relates to an ID token with a protected memory area for storing the at least one attribute, with means for authenticating a user assigned to the ID token relative to the ID token, means for authenticating a first computer system relative to the ID token, means for establishing a protected connection to the first computer system by means of which the first computer system can read the at least one attribute, means to receive a first soft token via the protected connection from the first computer system wherein the first soft token contains the at least one attribute, and means to issue the first soft token wherein a necessary prerequisite for reading the at least one attribute from the ID token by the first computer system is the successful authentication of the user and the first computer system relative to the ID token.

According to one embodiment of the invention, the first soft token is stored in a memory area of the ID token, on which an external read-access can take place via the interface of the ID token. For example, the first soft token can be read by the third computer system, i.e., the user computer system, and transmitted by the third computer system to the device.

In addition to the authentication of the first computer system relative to the ID token, as is actually known, for example, by extended access control for machine-readable travel documents (MRTD) and specified by the International Civil Aviation Organization (ICAO), the user must in fact authenticate himself relative to the ID token. For example, by a successful authentication of the user relative to the ID token, the user is approved, so that additional steps, namely the authentication of the first computer system relative to the ID token and/or the establishing of a protected connection for reading the attributes can run.

According to one embodiment of the invention, the ID token has means for end-to-end encryption. This makes it possible the establish the connection between the ID token and the first computer system via a third computer system of the user, since the user cannot make any changes to the data transmitted over the connection due to end-to-end encryption.

In an additional aspect, the invention relates to a first computer system with means to receive a signal, means for authentication relative to an ID token, means for receiving the at least one attribute from the ID token via a protected connection, means for time-stamping the at least one attribute, means for generating a first soft token that contains the at least one signed, time-stamped attribute, and means for sending the first soft token, wherein the reception of the at least one attribute assumes that a user assigned to the ID token and the computer system have authenticated themselves relative to the ID token.

According to one embodiment of the invention, the first computer system can contain means for generating a request to the user. After the first computer system has received the signal, it then sends a request to the third computer system of the user so that the user is requested to authenticate himself relative to the ID token. After the authentication of the user relative to the ID token has been successfully executed, the first computer system receives a confirmation from the third computer system. Thereupon, the first computer system authenticates itself relative to the ID token and a secure connection between the ID token and the first computer system is established using end-to-end encryption.

According to one embodiment of the invention, the first computer system has a plurality of certificates that each specify different read permission rights. After receiving a signal with the attribute specification, the first computer system selects at least one of these certificates with the reading permission rights sufficient for reading the specified attributes.

Embodiments of the first computer system according to the invention are especially advantageous since they form, in combination with the need to authenticate the user relative to the ID token, a trust anchor for the unaltered, digital identity of the user. Hereby, it is particularly advantageous that this requires no prior registration of the user relative to the computer system as well as no central storage of the user attributes forming the digital identity.

According to one embodiment of the invention, the computer system is an officially certified trust center, in particular a Signature Act-compliant trust center.

Furthermore, embodiments of the invention are explained in greater detail with reference to the drawings.

Elements of the following embodiments that correspond to each other are characterized with the same reference signs.

Figure 1:
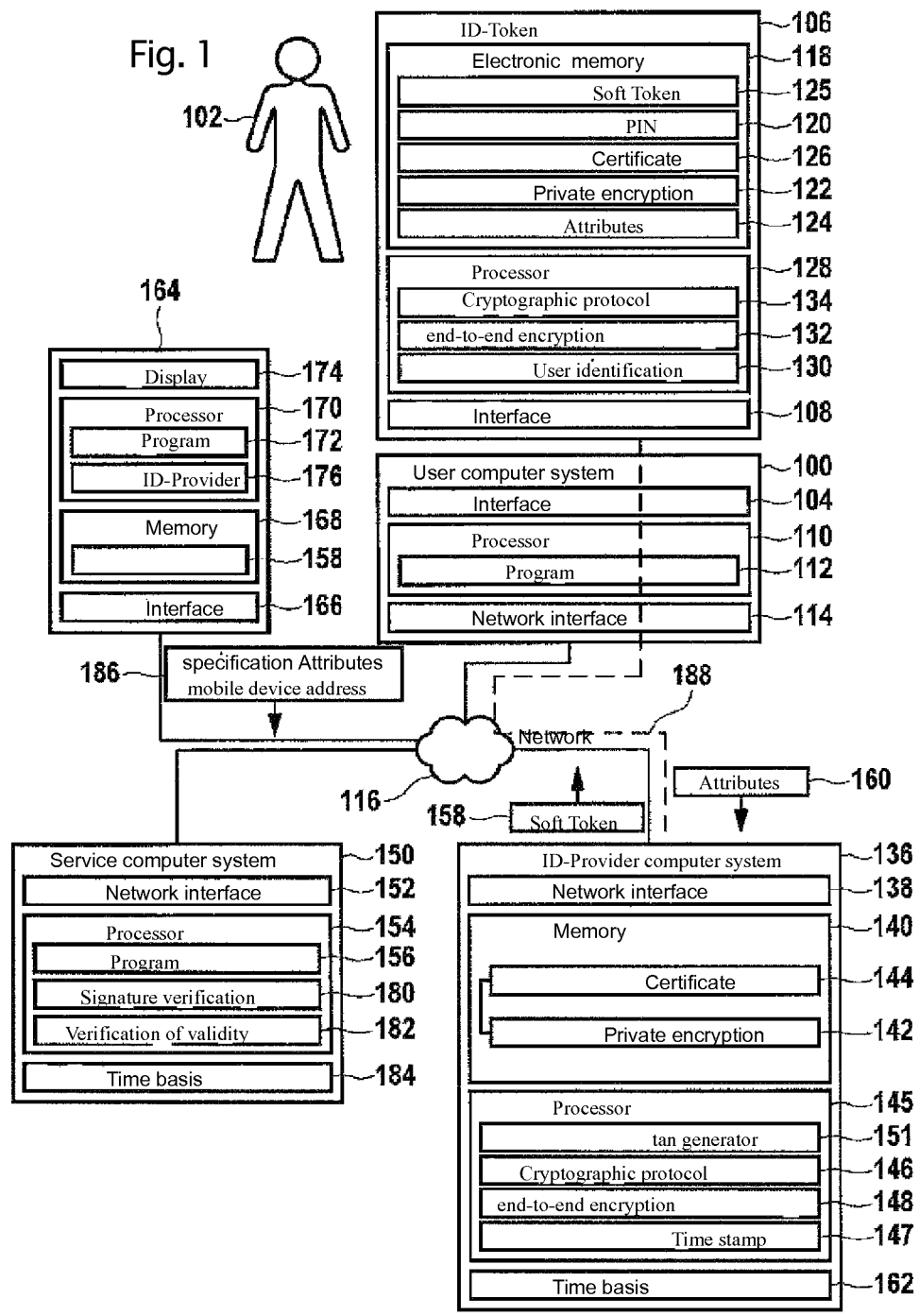
FIG. 1 depicts a block diagram of a first embodiment of a computer system according to the invention pertaining to generating and transmitting the first soft token to a device.

FIG. 1 depicts a user computer system 100 of a user 102. User computer system 100 may be a personal computer, a portable computer, such as a laptop or palmtop computer, a personal digital assistant, a mobile telecommunications device, in particular a smartphone, or similar. User computer system 100 has an interface 104 for communicating with an ID token 106 that has a corresponding interface 108.

User computer system 100 has at least one processor 110 for executing program instructions 112 as well as a network interface 114 for communicating via a network 116. The network may be a computer network, such as the Internet for example.

ID token 106 has an electronic memory 118 with protected memory areas 120, 122, and 124. Protected memory area 120 serves to store a reference value that is used for authenticating user 102 relative to ID token 106. This reference value is an identifier for example, in particular a personal identification number (PIN), or reference data for a biometric feature of user 102, which can be used for authenticating the user relative to ID token 106.

ID token 106 also has a memory area 125 for storing the first soft token 158. This can be, for example, a memory area of a bulk memory of the ID token, which one can access externally by way of interface 108.

Protected area 122 serves to store a private code and protected memory area 124 serves to store attributes, such as those of user 102 for example, such as, for example, his name, place of residence, date of birth, sex, and/or attributes that pertain to the ID token itself, such as, for example, the institution that generated or issued the ID token, the validity period of the ID token, an identifier of the ID token, such as for example a passport number or a credit card number.

Electronic memory 118 can also have a memory area 126 for storing a certificate. The certificate contains a public key that is assigned to the private key stored in protected memory area 122. The certificate may have been generated according to a public key infrastructure (PKI) standard, for example according to the X.509 standard.

The certificate is not required to be stored in electronic memory 118 of ID token 106. As an alternative or in addition, the certificate can also be stored in a public directory server.

ID token 106 has a processor 128. Processor 128 serves to execute program instructions 130, 132, and 134. Program instructions 130 are for user authentication, i.e., to authenticate user 102 relative to the ID token.

For an embodiment with PINs, user 102 enters his PIN, for his authentication, into ID token 106, for example via the user computer system 100. By executing program instruction 130, access is provided to protected memory area 120 to compare the entered PIN with the PIN reference value stored there. In the event that the entered PIN matches the reference value of the PIN, user 102 is considered authenticated.

Alternatively, a biometric feature of user 102 is recorded. For example, ID token 106 has a fingerprint sensor to do so or a fingerprint sensor is connected to user computer system 100. The recorded biometric data of user 102 is compared by executing program instructions 130 in this execution form with the biometric reference data stored in protection memory area 120. If the recorded biometric data of user 102 sufficiently matches the biometric reference data, user 102 is considered authenticated.

Program instructions 134 serve to execute the steps pertaining to ID token 106 of a cryptographic protocol for authenticating an ID-provider computer system 136 relative to ID token 106. The cryptographic protocol can be a challenge-response protocol based on a symmetric key or an asymmetric key pair.

For example, an extended access control process is implemented by the cryptographic protocol as is specified for machine-readable travel documents (MRTD) by the ICAO. Through the successful execution of the cryptographic protocol, ID-provider computer system 136 authenticates itself relative to the ID token and thereby verifies its reading permission rights for reading the attributes stored in protected memory area 124. Authentication may also be mutual, i.e., ID token 106 must then authenticate itself relative to ID-provider computer system 136 according to the same or another cryptographic protocol.

Program instructions 132 are for the end-to-end encryption of data transmitted between ID token 106 and ID-provider computer system 136, however, the at least attributes read by ID-provider computer system 136 from protected memory area 124. For end-to-end encryption, one can use a symmetric key, which for example is agreed upon when executing the cryptographic protocol between ID token 106 and ID-provider computer system 136.

As an alternative to the embodiment depicted in FIG. 1, user computer system 100 cannot communicate directly with interface 108; instead, it does so via a reading device connected to interface 104 for ID token 106. By way of this reading device, such as a Class 2 chip card terminal for example, one can also enter the PIN.

ID-provider computer system 136 has a network interface 138 for communicating via network 116. ID-provider computer system 136 also has a memory 140, in which is stored a private key 142 of ID-provider computer system 136 as well as corresponding certificate 144. This certificate, for example, can be a certificate according to the PKI standard, such as X.509 for example.

ID-provider computer system 136 also has at least one processor 145 for executing program instructions 146 and 148. By executing program instructions 146, the steps of the cryptographic protocol, which pertain to the ID-provider computer system 136, are executed. Therefore, overall, the cryptographic protocol is implemented by the execution of program instructions 134 by process 128 of ID token 106 as well as by the execution of program instructions 146 by processor 145 of ID-provider computer system 136.

Program instructions 148 serve to implement the end-to-end encryption on the part of ID-provider computer system 136, for example, based on the symmetric key, which was agreed upon when executing the cryptographic protocol between ID token 106 and ID-provider computer system 136. In principle, each intrinsically foreknown method for agreeing on a symmetric key can be used for end-to-end encryption, such as a Diffie-Hellman key exchange, for example.

ID-provider computer system 136 is preferably located in a specially protected environment, particularly in a trust center, so that ID-provider computer system 136 in combination with the need to authenticate user 102 relative to ID token 106 forms the trust anchor for authenticating the attributes read from ID token 106.

The processor 145 is further used for the execution of program instructions 147, which are used for the time stamping of the attributes 160 received from the ID-token. For this purpose, a time basis 162 of the first computer system 136 is accessed by the execution of the program instructions. The time basis 162 delivers for example, the current time as Unix time. To the current time a time interval of, e.g., some days are added so that a maximum validity term results. With this validity time the attributes 160 are individually time-stamped. The time-stamped attributes shall then be separately signed with the assistance of certificate 144 and the private key 142 by the ID-provider computer system 136. The time-stamped and signed attributes 160 are then summarized in the soft token 158.

The processor 145 further is used for the execution of program instructions 151. Through the execution of program instructions 151 one or several identifications for the soft token 158 are generated. In this context a password, a PIN or a TAN-list may be involved. As a prerequisite for the use of the soft token 158 as a data source, the identification must be entered in this case so that the user authenticates himself with respect to the soft token.

The ID-provider computer system 136 may be connected with a printer which prints out the identification resp. the identifications. The printout will then be sent to the user 102 for instance by mail, in particular; as a so-called PIN or TAN-letter. Alternatively or additionally, one or several identifications may be sent to the user 102 electronically as, for example by SMS and e-mail. Alternatively or additionally, at least one identification may be made available on a website of the first computer system 136 for downloading by user 102.

User 102 has a device 164 available such as, for instance, a so-called handy or smartphone. Device 164 has an interface 166 for communication through network 116. Interface 166 may be in particular a mobile phone interface for a digital cellular mobile. In particular the interface 166 may have been developed for the execution of a mobile Internet protocol so that user 102 can use the Internet with the assistance of device 164, such as, for example, a so-called handy or smartphone.

The mobile phone device 164 has an electronic memory 168 for the storage of the soft token 158. This memory can be an integral component of device 164. This has the advantage that user 102 may comfortably use the soft token 158 for different devices.

Device 164 has a processor 170 for the execution of program instructions 172, by which in particular an Internet browser and a user-interface may be implemented. The user-interface includes a reference 174 to device 164.

Processor 170 further serves for the execution of program instructions 176, by which an ID-provider-functionality is realized. In particular, the program instructions 176 are used for the generation of a second soft token 178 see FIG. 2) from the first soft token 158.

A service computer system 150 may be developed for the receipt of an order for a service or product, in particular an online service. For example, the user 102 can open an online account with a bank through network 116 with the assistance of his device 164 or use other financial or bank services. The service computer system 150 can also be developed as an online warehouse so that the user 102 can, for instance, acquire a product online. Moreover, the service computer system 150 may also be developed for the delivery of digital content, such as for the download of music and/or video data.

The service computer system 150 has for this purpose a network interface 152 for the connection with network 116. Further the service computer system 150 has at least one processor 154 for the execution of program instructions 156. By the execution of program instructions 156 for instance, dynamic HTML pages are generated, through which the user 102 can enter his order.

Depending on the type of the requested or ordered products or service, the service computer system 150 must examine one or several attributes of the user 102 and/or his ID token 106 based on one or several established criteria. Only if this examination has been passed, the order or request of the user 102 is accepted and/or implemented.

For example, the opening of a bank account or the purchase of a mobile phone with a pertinent contract requires that the user 102 reveal his identity through the service computer system 150 and that this identity is examined. According to the state-of-the-art the user 102 must submit his personal identification card for this purpose. This process is replaced by the readout of the digital identity of the user 102 from his ID token 106.

Depending on the applicable case, the user 102 does not have to reveal his identity through the service computer system 150, but it is sufficient to communicate for example just one of the attributes. For example, the user 102 may prove one of the attributes to prove that he is a member of a certain group of persons, which is entitled access to the data available for download on the service computer system 150. For example, such criterion may be the minimum age of the user 102 or the membership of user 102 in a group of persons, which is entitled access to certain confidential data.

Processor 154 of the service computer system 150 is further used for the execution of program instructions 180 and 182. In addition, the service-computer system 150 has through a time-basis 184, which is synchronized with the time-basis 162 of the ID-provider-computer system 136.

Through the execution of the program instructions 180 the validity of a signature may be examined by the 150 service-computer system, in particular the signatures of time-stamped attributes of the soft token 178. By the execution of the program instructions 182 the service-computer system 150 may further examine whether the term of validity provided by the time stamps of the attributes has not been exceeded.

The procedure to produce the soft-taken 158 and is transferred to device 164 as follows:

1. Authentication of the user 102 relative to the ID token 106.

The user 102 authenticates himself relative to the ID token 106. In case of an implementation by PIN, the user 102 enters his PIN, for example, through the user computer-system 100 or a connected chip card-terminal. By executing the program instructions 130, the ID token 106 examines the correctness of the entered PIN. If the entered PIN agrees with the protected memory area 120 of the stored reference value of the PIN, the user 102 is considered authenticated. Analogously may be proceeded, if a biometrical feature of the user 102 is used for his authentication as described above.

2. Authentication of the ID-provider computer system 136 relative to the-ID token 106.

For this purpose a connection 188 is established between the ID token 106 and the ID-provider computer system 136 through the user computer system 100 and network 116. For example the id-provider computer system 136 transfers its certificate 144 through this connection to the ID-provider computer system 136 to the ID token 106. Through program instructions 134 a so-called challenge is generated, i.e., a chance number. This chance number is encrypted with the official key of the ID-provider computer system 136 contained in certificate 144. The resulting encrypted number is sent by the ID token 106 through the connection to the ID-provider computer system 136. The ID-provider computer system 136 deciphers the encrypted number with the assistance of a private key 142 and thus obtains the chance number. The chance number returns the ID-provider computer system 136 back to the ID token 106 through the connection. Through the execution of the program instructions 134 they will check whether the chance number received by the ID-provider computer system agrees with the originally generated chance number, i.e. the challenge. If this is the case, the ID-provider computer system 136 is considered authenticated vis-à-vis the ID token 106. The chance number may be used as symmetrical key for the end-to-end encryption.

3. After the user 102 has successfully authenticated himself relative to the ID token 106, and after the ID-provider-computer system 136 has successfully authenticated itself relative to the ID token 106, the ID-provider-computer system 136 receives a reading entitlement to select one, several or all of the attributes stored in the protected storage area 124. On account of a corresponding reading command, which the 136 ID-provider computer system is sending through the connection to the ID token 106, the requested attributes are read out of the protected storage area 124 and are encrypted by the implementation of the program instructions 132. The encrypted attributes 160 are transferred to the ID-provider computer system 136 through the connection and they are then encrypted by the execution of the program instructions 148. Thus the ID-provider computer system 136 of the attributes 160 read out of the ID token 106.

The execution of the above-mentioned steps 1 through 3 is, for example triggered by a signal 186, which is sent by the user-computer system 100 to the ID-provider computer system 136. For example, the user 102 gives the user-computer system 100 an order to generate the soft token 158 for his device 164, whereupon the signal 186 is generated by the performance of the program instructions 112 and sent through the network-interface 114 to the ID-provider computer system 136. The signal 186 may include a first attribute specification, which indicates, which of the attributes stored in the storage area 124 are to be included in the production of the soft token 158. If the signal 186 does not include such attribute specification, so may depending on the implementation form predefined attributes or all attributes, which are stored in the storage area 124, be included in the production of the soft token 158.

In addition, signal 186 may include an address of device 164, such as, e.g., its telephone number.

4. After the receipt of the attributes 160 these shall be stamped with a separate time stamp, which, e.g., indicates the term of validity by executing the program instructions 147. The time-stamped attributes 160 shall then be signed separately from the ID-provider computer system 136 with the assistance of certificate 144 and the private key 142 and be summarized in the soft token 158. The soft token 158 can be produced so that it use as data source requires a prior user-authentication with the assistance of an identification, which is produced by the execution of program instruction 151 and is transmitted to the user 102.

Depending on the form of execution, the soft token 158 is transferred through the protected connection 188 of the ID-provider computer system 136 to the ID token 106 and there stored in the storage area 125. The user computer system 100 may access this storage area 125 with the assistance of interface 104, in order to read the soft token 158 from there and to transfer it through the network interface 114 to the device, where the soft-token 158 will be stored in the storage area 168.

The transfer of the soft token 158 from the ID-provider computer system 136 to the device 164 may occur also directly to the address of the device as, e.g., by sending an SMS to the telephone number of the device or by sending an e-mail to an e-mail address of the device.

By the necessity of the authentication of the user 102 relative to the ID token 106 and the authentication of the ID-provider computer system 136 relative to the ID token, the necessary trust anchor has been created so that the required safety exists that the attributes contained in the soft token 158 are accurate and not falsified.

Depending on the form of execution, the sequence of the authentication may vary. For example, it may be provided that at first the user 102 has to authenticate himself vis-à-vis the ID token 106 and subsequently the ID-provider computer system 136. But it is principally also possible that at first the ID-provider computer system 136 must authenticate itself relative to the ID token 106 and subsequently the user 102.

In the first case, the ID token 106 is, e.g., so formed that it may only be cleared by the input of a correct PIN or a correct biometric feature by the user 102. Only this clearance allows the start of the program instructions 132 and 134 and thus the authentication of the ID-provider computer system 136.

In the second case, a start of the program instructions 132 and 134 is already possible if the user 102 has not yet authenticated himself relative to the ID token 106. In this case, the 134 program instructions are, e.g., formed in such manner that the ID-provider computer system 136 will only be accessible to perform the reading of one of several 124 attributes after the program instructions 130 have been signaled the successful authentication of the user 102.

Of special advantage is the use of the ID token 106 for, e.g., E-Commerce and E-Government application, and in particular, media break-free and legally secure on account of the necessity of authentication of the user 102 and the ID-provider computer system 136 vis-à-vis the trust anchor formed by the D-token 106. Of special advantage is that a central storage of the attributes of different 102 users is not required so that the data protection problems existing in the state-of-the-art are solved. Regarding the convenience of the application of the proceeding, it is of special advantage that a prior registration of the user 102 for the use of the ID-provider computer system 136 is not required.

Of additional further special advantage is that by the ID-provider computer system 136 no profile can be prepared with regard to the use of the soft token 158 because the use of the soft token 158 does not involve the use of the ID-provider computer system 136.

Figure 2:
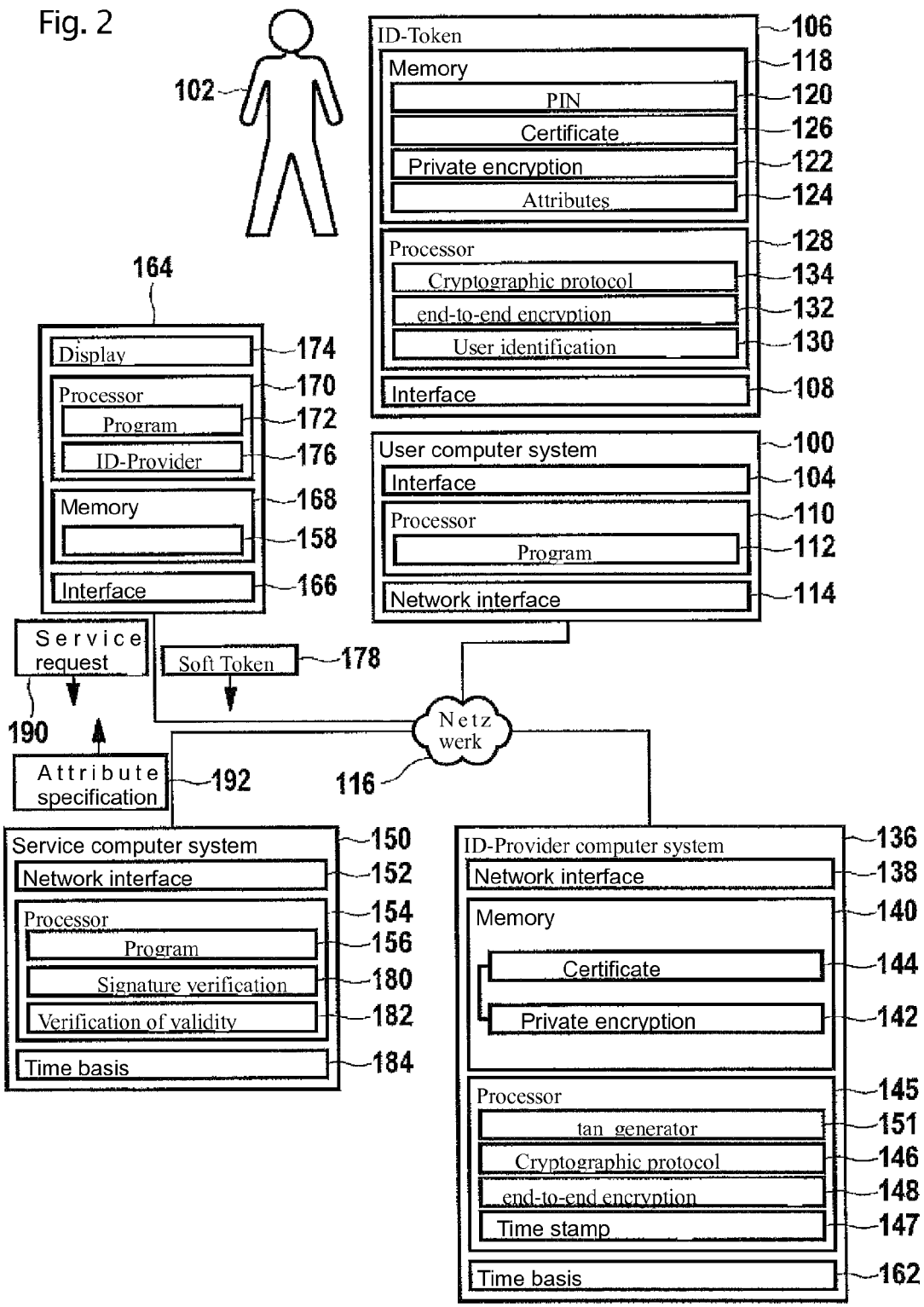
FIG. 2 depicts a block diagram of the first embodiment of computer systems according to the invention pertaining to the use of the first soft token.
Figure 3:
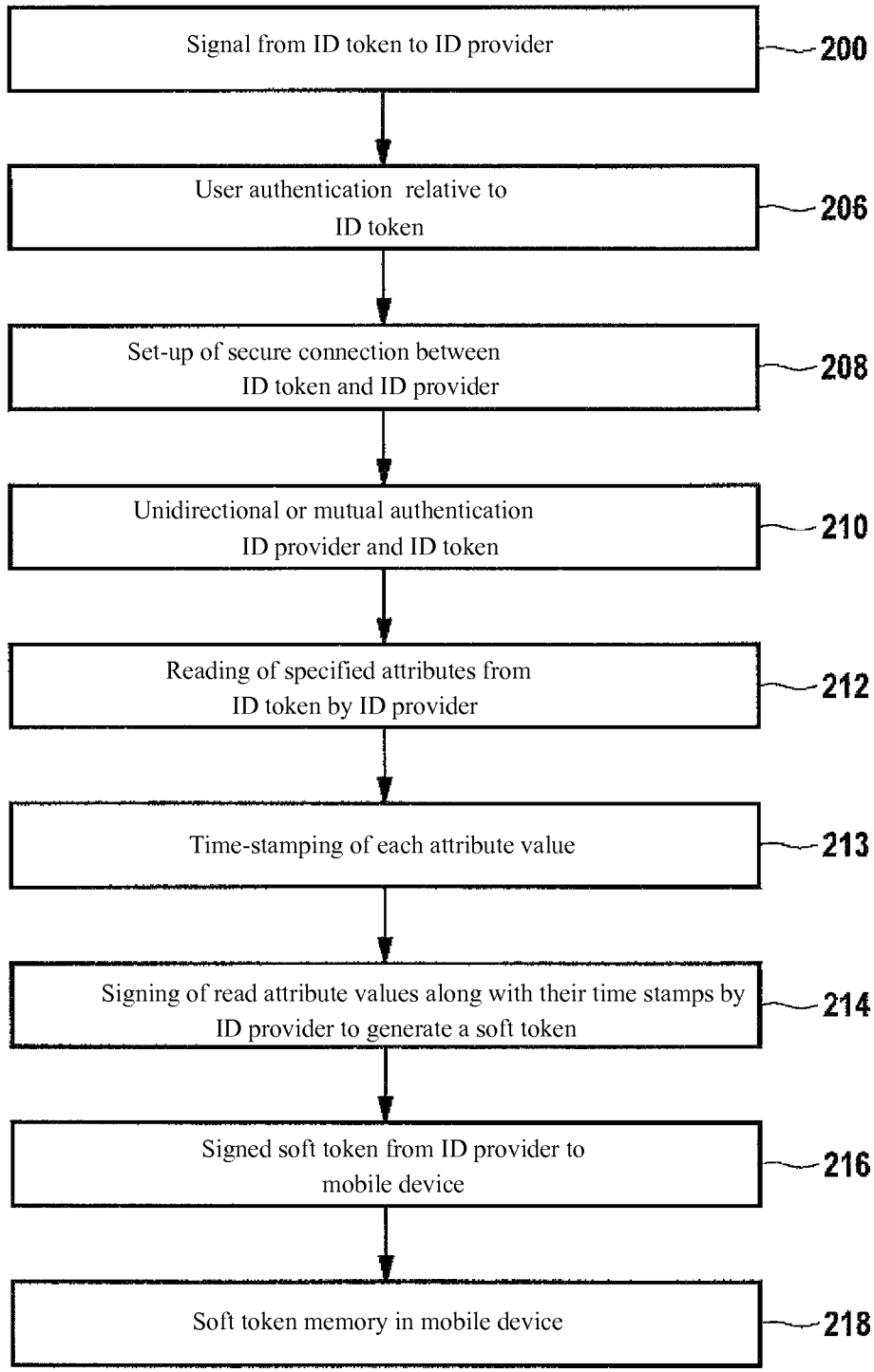
FIG. 3 depicts a flowchart of an embodiment of a method according to the invention pertaining to generating and transmitting the first soft token to a device.

FIG. 2 shows such a use of the soft token 158 with the assistance of device 164 relative to the service computer system 150. For example the user 102 is starting the Internet browser of his device 164, enters a URL of the service computer system 150, to load a website and selects then on this website a service. By operating the input key a corresponding service requirement 190 is generated by the device 164 and through the network 116 transferred to the service computer system 150. The service computer system 150 responds with a second attribute specification 192, in which those attributes are specified, whose attribute values the service computer system 150 requires to render he requested service.

On account of receiving the attribute specification 192 by the device 164 subsequently the execution of the program instructions 176 is started by device 164 to generate e second ID token 178. For this purpose, the execution of the program instructions 176 accessed the soft token 158 stored in the storage 168. The soft token 158 will be used as data source to read the attributes stored in the attribute specification 192 and their signatures out of the soft token 158 and to summarize them in soft token 178. A prerequisite for this may be that the user 102 through the user-interface of the device 164 enters a corresponding identification, in particular a TAN, to authenticate himself relative to the soft token 158.

The soft token 178 will then be sent by the device 164 through the network 116 to the service computer system 150. By the execution of the program instructions 180 the service computer system 150 examines whether the signatures of the time-stamped attributes of the soft token 178 are valid. In addition, it is examined by the execution of the program instructions 182 with the assistance of time basis 184 whether the validity term provided by the time stamp of the attributes has not yet been exceeded. If the signatures are valid and the validity term has not been exceeded the service computer system 150 may subsequently provide the required service if the attribute values for it satisfies the required criteria.

FIG. 2 shows a form of execution of a procedure in accordance with the invention. In step 200 the signal is sent from the user computer system to the service computer system. For example, the user starts for this purpose an Internet browser of the user computer system and provides a URL for the upload of a website of the ID-provider computer system. In the uploaded website the user then inputs his request for the production of the first soft token.

The user can specify one or several attributes in this connection. In particular the user may specify such attributes, which determine the digital identity of the user.

In order to provide the ID-provider computer system the possibility to read attributes out of his own ID token, the user authenticates himself in step 206 relative to the ID token.

In step 208 a connection between the ID token and the ID-provider computer system is established. In this context primarily a secured connection is involved, e.g., after a so-called secure messaging procedure.

In step 210 at least an authentication of the ID-provider computer system relative to the ID token through a connection established in step 208 is authenticated. In addition an authentication of the ID token relative to the ID-provider computer system may also be intended through the connection established in step 208.

After the user as well as the ID-provider computer system has been successfully authenticated relative to the ID token, the ID-provider-computer system receives from the ID token access authorization to read out the attributes. In step 212 the ID-provider computer system selects one or several read commands for reading out the attributes required according to the attribution specification from the ID token. The attributes are then transferred by end-to-end encryption through the secured connection to the ID-provider computer system and are encrypted there.

The read-out attribution values are provided in step 213 with a time stamp by the ID-provider computer system and in step 214 signed by the ID-provider computer system. By this the first soft token is produced.

In step 216 the ID-provider computer system sends the first soft token through the network. The first soft token reaches the device either directly or through the user computer system.

In the latter case the user may have the possibility to take not oft he signed attribute values of the first soft token and/or to supplement it by additional data. It may be provided that the signed attribute values with the supplemented data, if applicable, will only be passed on by the user computer system to the device after the release by the user. Therefore, the greatest possible transparency for the user with regard to the ID-provider computer system produced soft-token is created.

In step 218 the first soft token is stored in a memory of the device.

Figure 4:
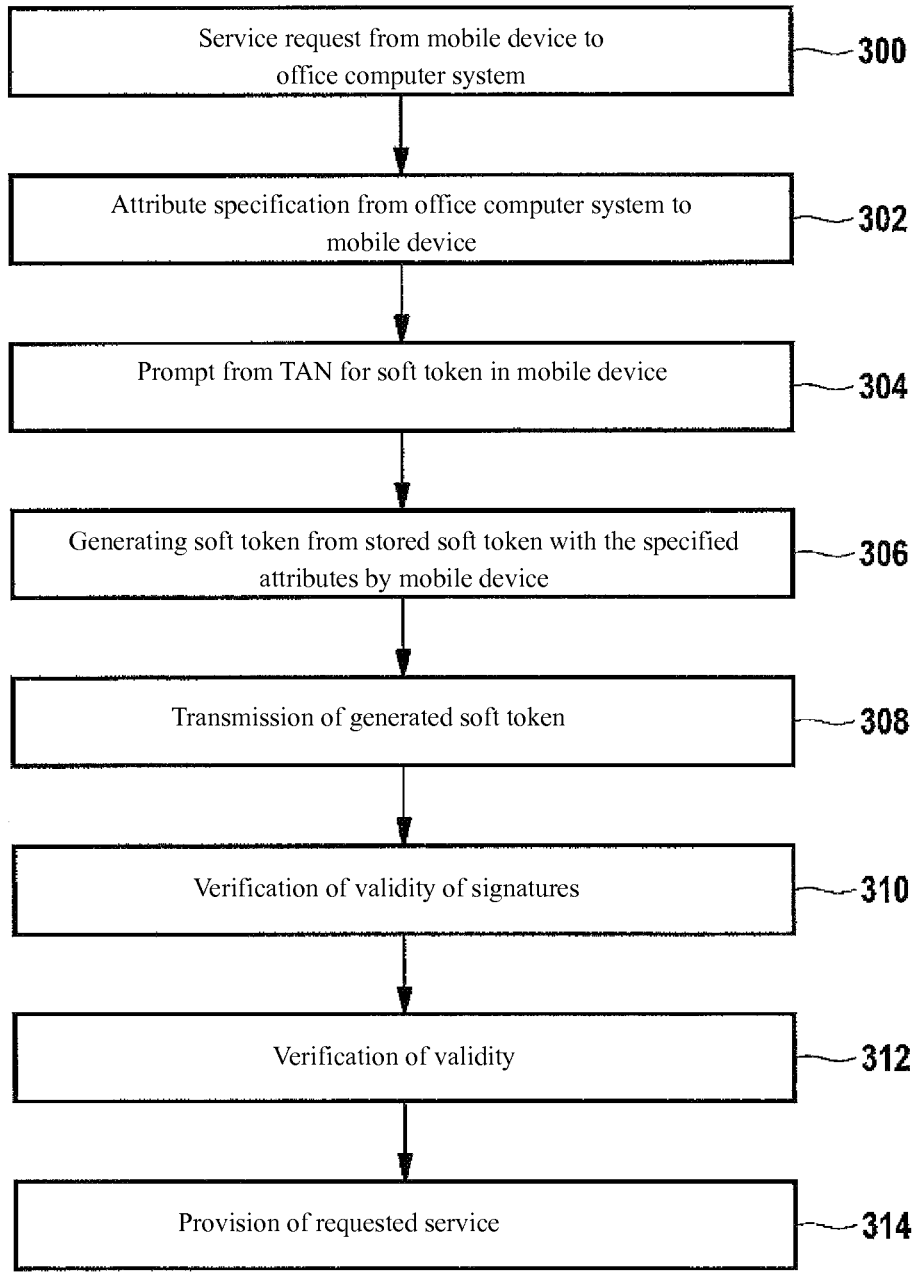
FIG. 4 depicts a flowchart of an embodiment of a method according to the invention pertaining to the use of the first soft token.

FIG. 4 shows an execution form of a procedure in accordance with the invention for use of the first soft token. In step 300 a service-request is sent by the device to a service computer system to request the rendering of an online service made available by the service computer system vis-à-vis the device. In step 302 the service computer system responds with an attribute specification, which the service computer system sends to the device. The attribute specification includes a statement of those attributes whose attribute values the service computer system requires for the rendering of the requested services.

After the receipt of the attribute specification by the device, the device generates an input request for the user to request the latter to input the authentication data such as, e.g., a TAN, in order to authenticate itself relative to the first soft token stored in the device. Under the prerequisite that this authentication in step 304 has been performed successfully, in step 306 subsequently a second soft token is generated from the stored first soft token. The second soft token includes an attribute specification received from the service computer system selection of the signed and time-stamped attributes of the first soft token. If the attribute specification lists all attributes stated in the first soft token, the second soft token constitutes a copy of the first soft token.

The second soft token is then transferred by the device in step 308 to the service computer system. The service computer system examines then in step 310 the validity of the signatures of the time-stamped attribute values as well as in step 312, whether the validity term has been exceeded. In step 314 the requested service may then be performed by the service computer system vis-à-vis the device, if the signatures are valid, the validity term has not been exceeded and if further the attribute values satisfy the criteria required for the rendering of the service.

REFERENCE LIST

100 User computer system
102 User
104 Interface
106 ID token
108 Interface
110 Processor
112 Program instructions
114 Network interface
116 Network
118 Electronic memory
120 Protected memory area
122 Protected memory area
124 Protected memory area
125 Memory area
126 Memory area
128 Processor
130 Program instructions
132 Program instructions
134 Program instructions
136 ID-provider computer system
138 Network interface
140 Memory
142 Private encryption
144 Certificate
145 Processor
146 Program instructions
147 Program instructions
148 Program instructions
149 Program instructions
150 Service computer system
151 Program instructions
152 Network interface
154 Processor
156 Program instructions
158 Soft token
160 Attribute
162 Time basis
164 Device
166 Interface
168 Memory
170 Processor
172 Program instructions
174 Indication
176 Program instructions
178 Soft token
180 Program instructions
182 Program instructions
184 Time basis
186 Signal
188 Connection
190 Service request
192 Attribute specification

What is claimed is:

1. A method for transferring at least one attribute of a plurality of attributes stored in an identification token (ID token) to a device that has no interface for communicating with the ID token, wherein the ID token is assigned to a user, and wherein the ID token has an interface that communicates with a corresponding interface of a third computer system, the method comprising:
sending a signal from the third computer system to a first computer system via a network, wherein the signal contains an address for the device;
authenticating, by the ID token, the user;
authenticating, by the ID token, the first computer system using the third computer system;
following a successful authentication of the user and the first computer system, the first computer system:
performing read access of the plurality of attributes stored in the ID token,
adding a time stamp to each of the plurality of attributes read out by the first computer system,
generating a first soft token through providing a signature to each individual attribute of the plurality of attributes read from the ID token via the first computer system, and
sending the first soft token to the device via a network using the address of the device, wherein generating the first soft token is executed via separate signatures from each individual time stamped attribute of the plurality of attributes;

generating, by the device, a second soft token, derived from the first soft token and containing the at least one attribute of the plurality of signed attributes, and transmitting the second soft token from the device to a second computer system to enable the device to receive service from the second computer system;

wherein the signal contains a first attribute specification for the plurality of attributes to be read out from the ID token by the first computer system for the generation of the first soft token; and wherein the first computer system has a plurality of certificates having different reading permission rights selecting, by the first computer system, at least one of the certificates having reading permission rights for reading the plurality of attributes specified in the first attribute specification based on a reception of the first attribute specification by the first computer system.

2. The method according to claim 1, wherein authenticating the first computer system uses a certificate from the first computer system, wherein the certificate contains information regarding the plurality of attributes stored in the ID token, for which the first computer system has authorized read access.

3. The method according to claim 2, further comprising verifying, via the certificate, the read authentication of the first computer system for the read access of the plurality of attributes stored in the ID token.

4. The method according to claim 1, further comprising:
the first computer system sending the plurality of attributes read out by the first computer system from the ID token to the third computer system, and
the third computer system forwarding the plurality of attributes to the second computer system after the third computer system has been enabled by the user.

5. The method according to claim 4, further comprising the third computer system supplementing the plurality of attributes with further data prior to forwarding said plurality of attributes to the second computer system.

6. The method according to claim 1, wherein generating the first soft token is executed such that in order for it to be used, an identification is required, wherein the identification comprises a password, a personal identification number (PIN) or a transaction authentication number (TAN).

7. The method according to claim 1, further comprising:
establishing a first connection between the first computer system and the third computer system, and
transmitting the plurality of attributes read from the ID token to the first computer system using the first connection,
wherein the first connection is protected by an end-to-end encryption.

8. The method according to claim 7, wherein authenticating the first computer system by the ID token comprises executing a challenge-response procedure, where a systematic key for the end-to-end encryption of the first connection is derived from a challenge used for the challenge-response procedure.

9. The method according to claim 1, wherein the first soft token is sent from the first computer system via the third computer system to the device.

10. The method according to claim 1, wherein a time stamp added to an attribute read out by the first computer system provides an expiration date for the first soft token.

11. The method according to claim 1, further comprising:
sending a service request from the device to the second computer system, and
sending a second attribute specification from the second computer system to the device, wherein the second attribute specification specifies one or more of the plurality of attributes to be read from the ID token by the second computer system,
wherein the second soft token contains a subset of the attributes of the first soft token, the subset being given by the second attribute specification.

12. The method according to claim 11, further comprising:
checking whether the signature or signatures of the second soft token are valid,
checking, based on a time stamp of the second soft token, whether the expiration date of the second soft token has not yet expired, and
if the signature or signatures, respectively, are valid and the expiration date has not yet expired, providing the service requested in the service request, as long as the attributes of the second soft token fulfill one or more criteria that are a prerequisite for the providing the service requested.

13. A non-transitory computer readable storage device storing a program of instructions that, when executed by a computer system, control the computer to perform a method for reading at least one attribute stored in an identification token (ID token), wherein the ID token is assigned to a user, and wherein the ID token has an interface that communicates with a corresponding interface of a third computer system, the method comprising:
sending a signal from the third computer system to the first computer system, wherein the signal contains an address of a device that has no interface with the ID token,
authenticating, by the ID token, the user using the third computer system,
authenticating, by the ID token, a first computer system using a certificate from the first computer system, wherein the certificate contains information regarding the plurality of attributes stored in the ID token, for which the first computer system has authorized read access,
following a successful authentication of the user and the first computer system,
the first computer system performing read access of the plurality of attributes stored in the ID token, adding a time stamp to each of the plurality of attributes read out by the first computer system, generating a first soft token through providing a signature to each individual attribute of the plurality of attributes read from the ID token via the first computer system, and sending the first soft token via a network to the device using the address of the device, wherein generating the first soft token is executed via separate signatures from each individual time stamped attribute of the plurality of attributes,
the device generating a second soft token, derived from the first soft token and containing the at least one attribute of the plurality of signed attributes and transmitting the second soft token from the device to a second computer system to enable the device to receive a service from the second computer system device and wherein the first soft token is sent to the address of said device
wherein the signal contains a first attribute specification for the plurality of attributes to be read out from the ID token by the first computer system for the generation of the first soft token; and wherein the first computer system has a plurality of certificates having different reading permission rights selecting, by the first computer system, at least one of the certificates having reading permission rights for reading the plurality of attributes specified in the first attribute specification based on a reception of the first attribute specification by the first computer system.

14. A computer system comprising:

a hardware network interface configured to receive a signal containing a first attribute specification and a device address from a user computer system, a memory, a processor, operatively coupled to the hardware network interface, the processor having hardware operable to execute program instructions for:

authenticating the computer system to an identification token (ID token) that communicates with the user computer system via a hardware interface, reading at least one attribute from the ID token via a protected connection and in accordance with the first attribute specification contained in the received signal, adding a time stamp to each attribute read from the ID token, generating a first soft token, containing the at least one signed, time stamped attribute, and sending the first soft token via the network interface to a device using the device address, where reading of the at least one attribute requires that a user and the computer system assigned to the ID token have been authenticated using the ID token, and where the device has no hardware interface with the ID token;

wherein the first soft token is sent to the device using the device address via a protected connection with the user computer that provides end-to-end encryption; and wherein the memory further configured to store a plurality of certificates with different reading permission rights, and wherein the processor further configured to select at least one of the certificates based on a reception of the first attribute specification, having reading permission rights for reading the attribute specified in the first attribute specification.

15. The computer system according to claim 14, where the processor is operable to execute further program instructions to provide a signature on the at least one attribute, where the signed, time stamped attribute contained in the first soft token is sent to the device using the device address.

16. The computer system according to claim 14, where reading the at least one attribute from the first soft token requires the entering of an identification, in particular a password, a personal identification number (PIN) or a transaction authentication number (TAN).

* * * * *